(12) United States Patent
Makimoto et al.

(10) Patent No.: US 7,516,646 B2
(45) Date of Patent: Apr. 14, 2009

(54) IMPACT TEST APPARATUS

(75) Inventors: Yoshiki Makimoto, Tokyo (JP); Takashi Kojima, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/009,412

(22) Filed: Jan. 21, 2008

(65) Prior Publication Data

US 2008/0178655 A1 Jul. 31, 2008

(30) Foreign Application Priority Data

Jan. 31, 2007 (JP) ............................. 2007-022368

(51) Int. Cl.
*G01M 7/00* (2006.01)
(52) U.S. Cl. .................... 73/12.14; 73/12.12
(58) Field of Classification Search ............... 73/12.01, 73/12.09, 12.12, 12.14
See application file for complete search history.

(56) References Cited

U.S. PATENT DOCUMENTS 2,422,317 A 6/1947 Stock et al.
4,425,786 A * 1/1984 Sirkkola et al. ............ 73/12.14
5,003,811 A * 4/1991 Shannon et al. ............ 73/12.14
2007/0001664 A1 1/2007 Steinbrink et al.

FOREIGN PATENT DOCUMENTS

| DE | 102 13 232 B4 | 3/2005 |
|---|---|---|
| DE | 10 2004 011 100 (A) | 9/2005 |
| GB | 376726 (A) | 7/1932 |
| JP | 56-043526 | 4/1981 |
| JP | 58-213228 | 12/1983 |
| JP | 2001-141600 | 5/2001 |
| JP | 2001-235412 | 8/2001 |

* cited by examiner

*Primary Examiner*—Max Noori
(74) *Attorney, Agent, or Firm*—Carrier, Blackman & Associates, P.C.; Joseph P. Carrier; William D. Blackman (57) ABSTRACT

An apparatus for performing an impact test of an object of test by use of a hammer is disclosed. The apparatus includes a pendulum arm swingable in an up-down direction in response to rotation of a rotary cam. The rotary cam is driven to rotate by a rotational drive unit, so that the hammer provided on a distal end portion of the pendulum arm successively applies impacts to the object of test.

6 Claims, 8 Drawing Sheets

IMPACT TEST APPARATUS

FIELD OF THE INVENTION

The present invention relates to an improvement of impact or resistance test apparatus.

BACKGROUND OF THE INVENTION

To prevent an illegal act called "theft from a car", it is required for cars or automotive vehicles to have a sufficient durability against a destructive act from outside the vehicles. Generally, in automotive vehicles, front and rear window glasses and door glasses are fitted in a steel-made vehicle body, and these glasses are much more fragile than steel plates. Thus, such glasses are reinforced by heat treatment and/or by thickness increase. It is necessary to quantitatively confirm whether such reinforcing measures meet various criteria (anti-crime or crime-prevention criteria), and various impact (resistance) test apparatus have so far been used for such purposes.

One example of the impact test apparatus of the aforementioned type is known from Japanese Patent Application Laid-Open Publication No. 56-43526 (JP 56-43526 A) which discloses a dent test apparatus. The disclosed dent test apparatus will be discussed below with reference to FIGS. 11A and 11B hereof.

Figure 11A:
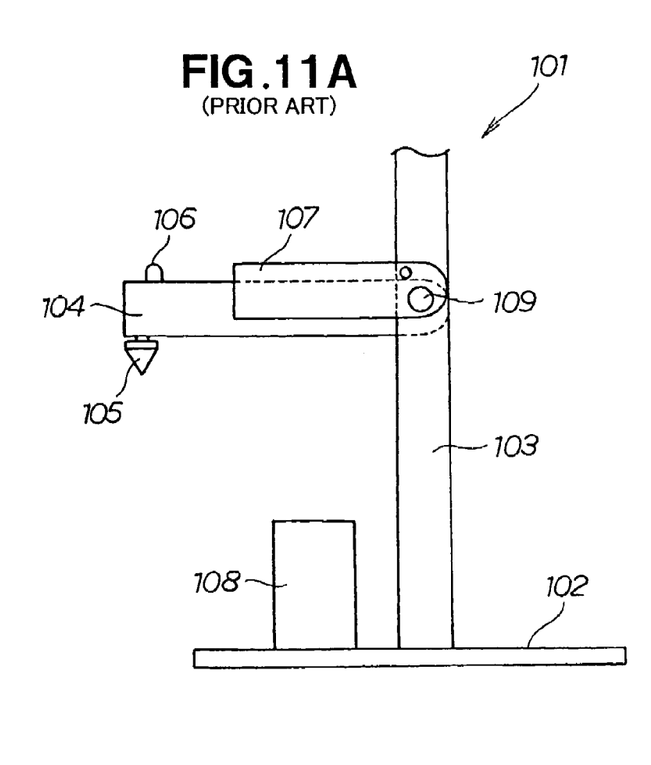
FIGS. 11A and 11B are schematic views showing a conventionally-known dent test apparatus.

As shown in FIG. 11A, the disclosed dent test apparatus 101 includes: a support post 103 fixedly mounted on a support table 102; an arm 104 vertically swingably mounted on a shaft 109 that is in turn provided on the support post 103; a hammer 105 fixed on a distal end surface portion of the vertically swingable arm 104; a handle 106 provided on another distal end surface portion of the arm 104; and a locking device 107 for locking the arm 104 at a swinging-movement start position.

Figure 11B:
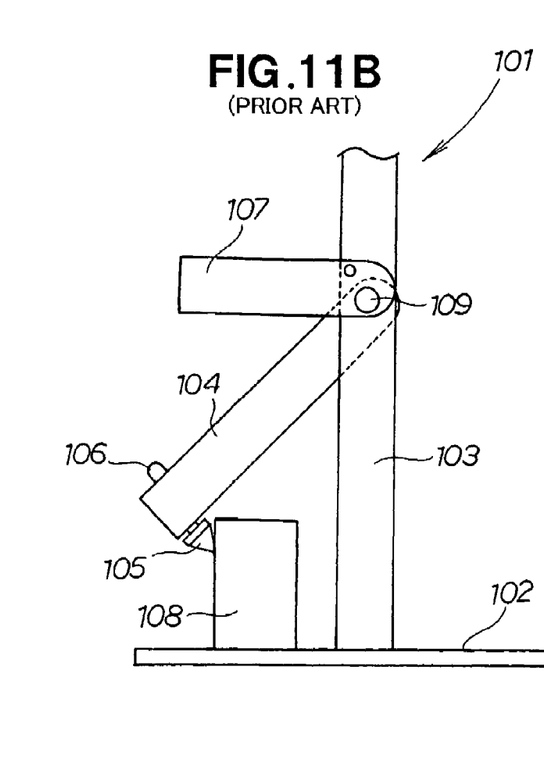

First, a human test operator holds the handle 106 to cause the arm 104 to be locked with the locking device 107. Then, the human test operator sets an object of test 108 on the support table 102 and then operates the locking device 107 to disengage the arm 104 from the locking device 107. As shown in FIG. 11B, the thus-disengaged arm 104 pivots about the shaft 109 downwardly or counterclockwise, so that the hammer 105 hits the object of test 108.

In the aforementioned manner, the conventionally-known dent test apparatus can readily and accurately reproduce an intensity and direction of energy applied at the time of an impact.

In a case where the object of test is a glass of an automotive vehicle, it is recommendable that the dent test be carried out by the glass being successively hit a plurality of times, e.g. five times. Thus, in this case, the human test operator has to repeat lifting and dropping the arm 104 a plurality of times, which would undesirably increase a load on the test operator and necessary test time and thus lead to a lowered test efficiency.

SUMMARY OF THE INVENTION

In view of the foregoing prior art problems, it is an object of the present invention to provide an improved impact test apparatus capable of successively hitting an object of test.

According to an aspect of the present invention, there is provided an improved impact test apparatus, which comprises: a support post disposed on a base plate; a rotational drive unit supported by the support post; a rotary cam adapted to be rotated by the rotational drive unit; a pendulum arm supported by the support post for swinging movement in a vertical direction; and a hammer disposed on a distal end portion of the pendulum arm. The pendulum arm has a proximal end portion abutting against the rotary cam, and the rotary cam is rotated by the rotational drive unit in one direction and a necessary number of times. The pendulum arm is driven to rotate by the rotational drive unit via the rotary cam, so that the hammer, provided on the distal end portion of the pendulum arm, can successively applies impacts to the object of test, as a result of which the impact test efficiency can be enhanced.

Preferably, the impact test apparatus of the present invention further comprises a number-of-hitting detection section for detecting the number of rotation of the rotary cam to thereby detect the number of times of hitting, by the hammer, of the object of test. With the number-of-hitting detection section, it is possible to deactivate the impact test apparatus upon completion of any desired number of times of hitting, by the hammer, of the object of test.

Preferably, the number-of-hitting detection section includes a plurality of projections provided on one side surface of the rotary cam, a projection detecting sensor for detecting the projections, and a number-of-rotation calculation section for calculating the number of rotation of the rotary cam on the basis of detection information acquired by the projection detecting sensor. With the detecting sensor for detecting the projections on the one side surface of the rotary cam, the impact test apparatus can be readily deactivated upon completion of any desired number of times of hitting, by the hammer, of the object of test.

Preferably, the rotational drive unit includes a brake. With the brake, the rotation of the rotary cam can be stopped promptly upon termination of a predetermined number of impacts, and particularly; the impact tests can be performed with no trouble even if the rotary cam is rotated at a high speed.

Preferably, the rotary cam comprises a plurality of rotary cam members differing from each other in cam shape, the rotary cam members are mounted on a common shaft in parallel to each other, and the common shaft is moved compulsorily so that one of the plurality of rotary cam members is caused to abut against the proximal end portion of the pendulum arm. Particularly, by compulsorily moving the common shaft, the same impact test apparatus can appropriately perform impact tests on a plurality of objects of test having different heights.

Preferably, the rotary cam comprises a plurality of rotary cam members differing from each other in cam shape, a relay member is provided between the rotary cam members and the proximal end portion of the pendulum arm, and the relay member is moved compulsorily so that one of the plurality of rotary cam members is caused to abut against the proximal end portion of the pendulum arm. By compulsorily moving the relay member, any one of the plurality of rotary cam members can be relayed to the proximal end portion of the pendulum arm; thus, the same impact test apparatus can appropriately perform impact tests on a plurality of objects of test having different heights.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
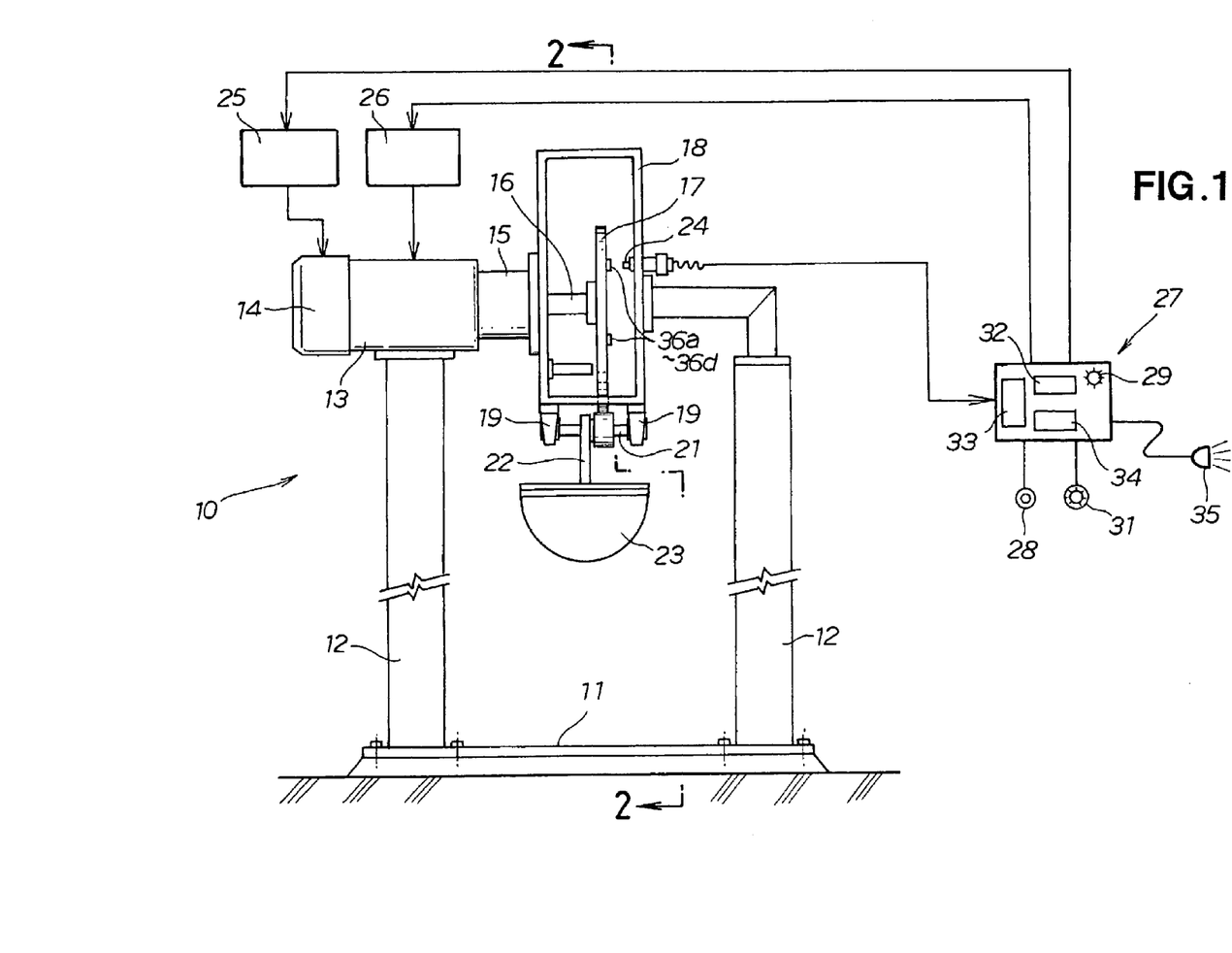
FIG. 1 is a side view showing an impact test apparatus according to a first embodiment of the present invention.
Figure 2:
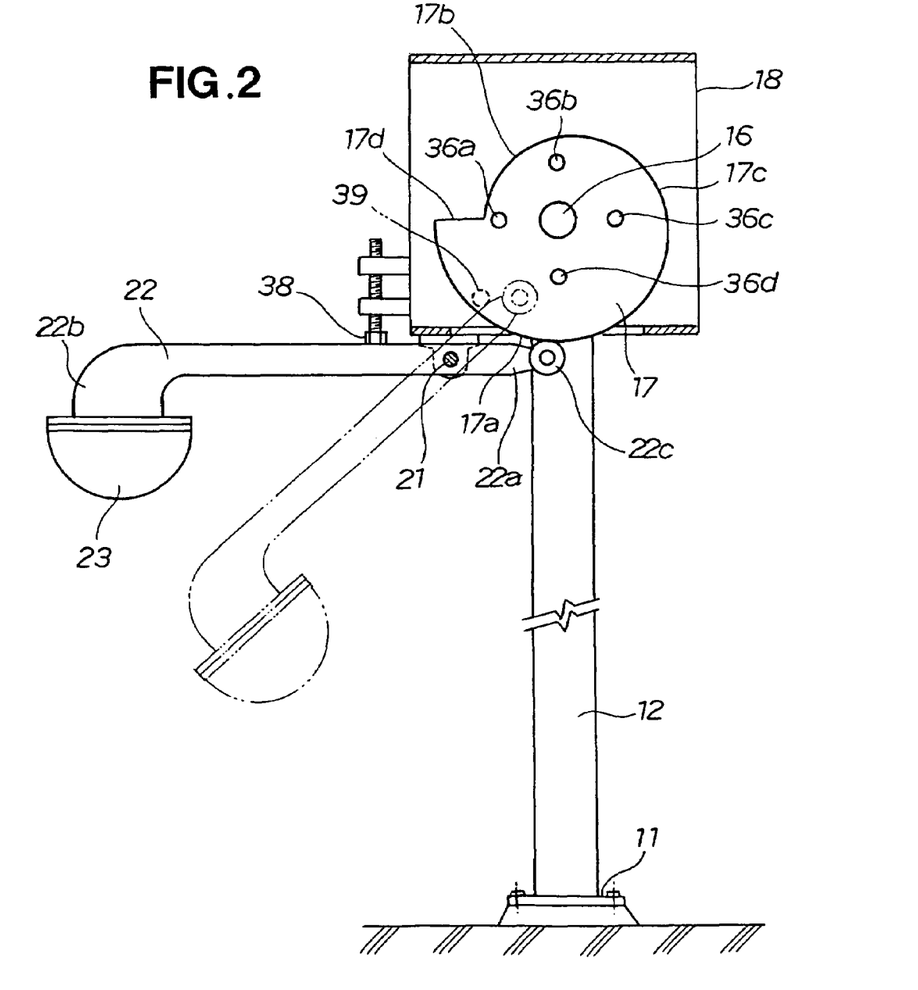
FIG. 2 is an enlarged sectional view taken along line 2-2 of FIG. 1.
Figure 3A:
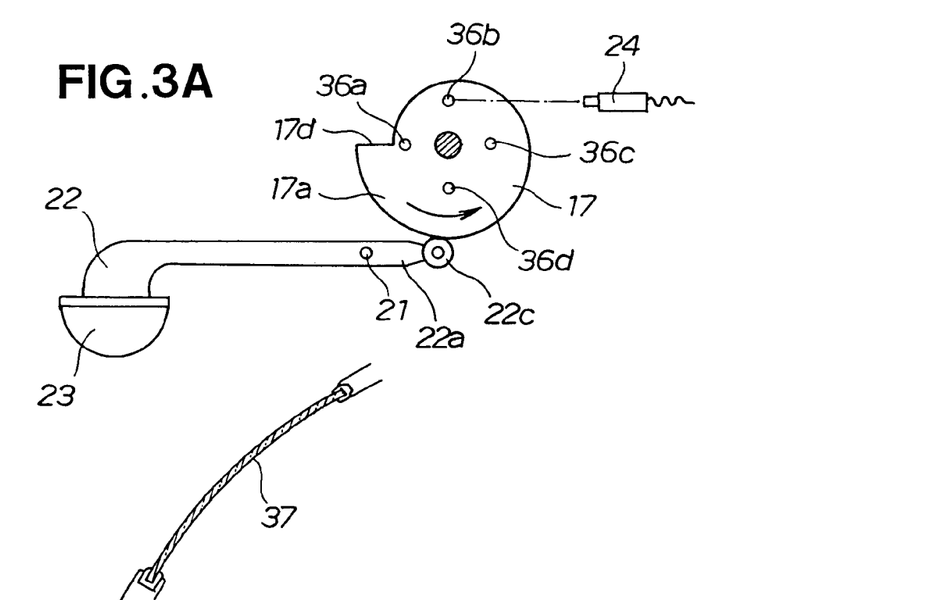
FIGS. 3A-3C are views showing the first embodiment in a test start state, hitting end state and start-position returning state.
Figure 3B:
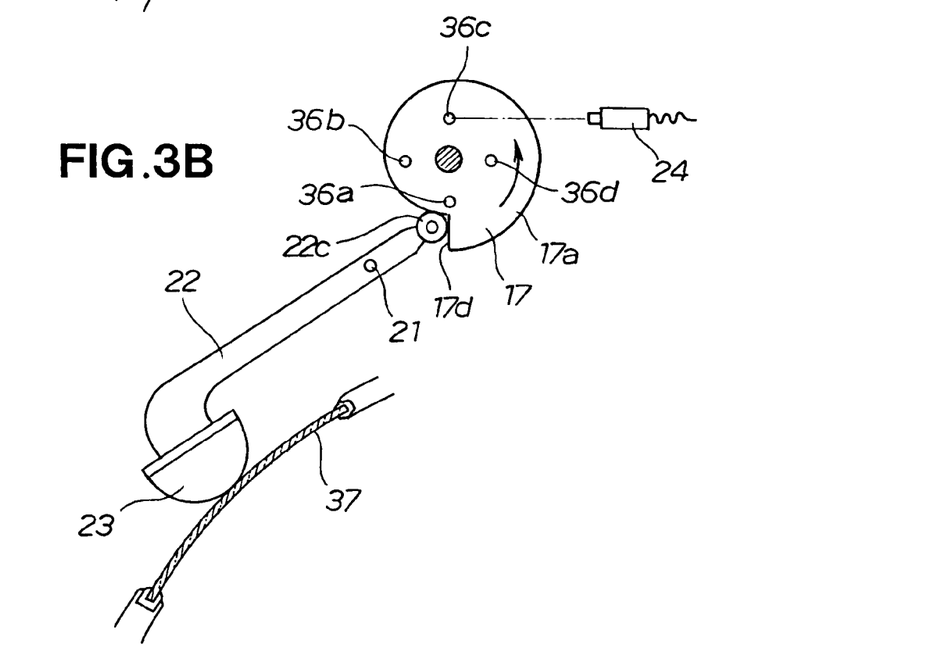
Figure 3C:
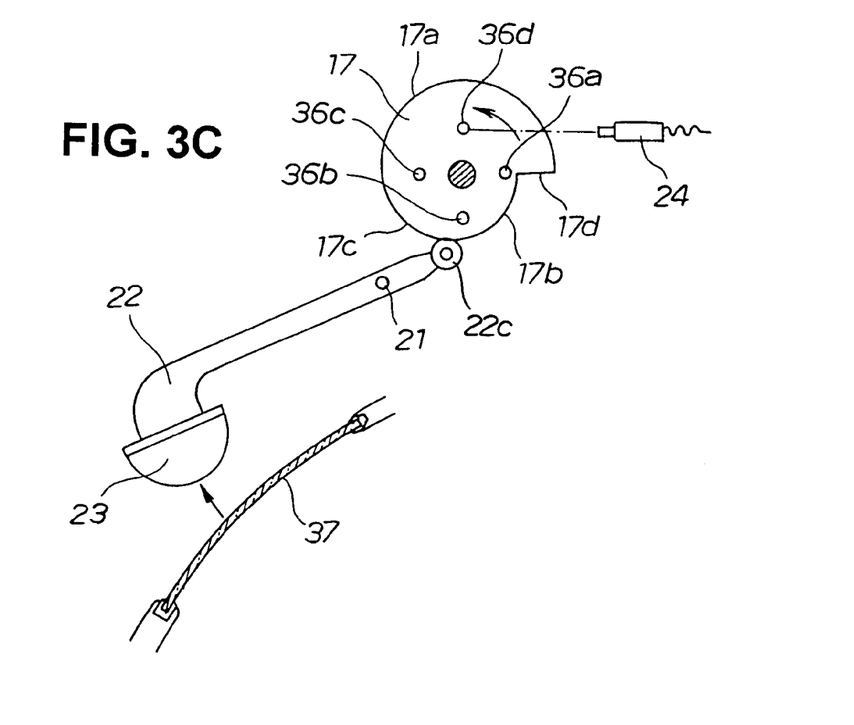

Reference is now made to FIGS. 1-3 showing an impact test apparatus according to a first embodiment of the present invention. The impact test apparatus 10 shown in FIG. 1 includes: a base plate 11; support posts 12 supported on the base plate 11; a rotational drive unit 13 supported on the left support post 12; a brake 14 attached to a rear (left in FIG. 1) end portion of the rotational drive unit 13; a speed reducer (transmission) 15 attached to a front (right in FIG. 1) of the rotational drive unit 13 for reducing a rotational speed of the drive unit 13; a rotary cam 17 attached to a rotation shaft 16 extending from the speed reducer 15; a box frame 18 supported by the speed reducer 15 and right support post 12; bearing boxes 19 fixed to front and rear lower ends of the box frame 18; a pendulum arm support shaft 21 connected at its opposite ends to and extending between the bearing boxes 19; a pendulum arm 22 having a roller 22c provided on its proximal end portion 22a (see FIG. 2) and held in abutting contact with the rotary cam 17; a hammer 23 attached to a distal end portion 22b of the pendulum arm 22; and a projection detecting sensor 24 provided in opposed relation to the rotary cam 17.

The rotational drive unit 13 is preferably in the form of an electric motor, although it may be a rotary actuator, such as an air motor or hydraulic motor.

The speed reducer 15 is preferably in the form of reduction gears; for example, it may comprise a combination of a plurality of gears or a planetary gear speed reducer.

The projection detecting sensor 24 is preferably in the form of a proximity switch that detects metal pieces (later-described projections) through an eddy current action; alternatively, the number of rotation may be detected directly by a rotary encoder.

The brake 14, rotational drive unit 13, brake driver 25 and motor driver 26 are controlled by a test apparatus control unit 27. For example, the test apparatus control unit 27 includes: a start switch 28; an operation lamp 29; a number-of-hitting setting dial 31; a set number-of-hitting display section 32; a number-of-rotation calculation section 33; an actual number-of-rotation display section 34 and a buzzer 35 that informs an end of the test.

As shown in FIG. 2, the rotary cam 17 has a plurality of projections 36a, 36b, 36c and 36d provided at equal angular pitches (e.g., 90° angular pitches). The rotary cam 17 is a disk-shaped cam that includes a large-diameter portion 17a, a small-diameter portion 17b, a diameter-changing portion 17c smoothly interconnecting the large- and small-diameter portions 17a and 17b, and a stepped portion interconnecting the large- and small-diameter portion 17a and 17b.

The box frame 18 includes an upper limit stopper 38 defining an upper limit of the pendulum arm 22, and a lower limit stopper 39 defining a lower stopper of the pendulum arm 22.

Next, with reference to FIGS. 3A-3C, a description will be given about behavior of the first embodiment of the impact test apparatus 10 arranged in the aforementioned manner.

In FIG. 3A, the proximal end of pendulum arm 22 is held in abutting contact with the large-diameter portion 17a of the rotary cam 17, so that the pendulum arm 22 is held at a predetermined test start position (height). The projection detecting sensor 24 detects the projection 36b. In these conditions, the rotary cam 17 is rotated in the counterclockwise direction at a predetermined speed. Then, once the roller 22c, provided at the proximal end portion 22a, shifts from the large-diameter portion 17a to the small-diameter portion 17b, the roller 22c of the pendulum arm 22 is released, and thus, the pendulum arm 22 rotates in the counterclockwise direction about the pendulum arm support shaft 21. Then, the hammer 23 hits the object of test 37, as shown in FIG. 3B.

FIG. 3C shows the hammer 23 returning to its test start position after having hit the object of test. Because the rotary cam 17 has been rotated in the counterclockwise direction at the predetermined speed, the pendulum arm 22 is rotated back about the pendulum arm support shaft 21 through the diameter-changing portion 17c via the roller 22c. As a consequence, the hammer 23 moves away from the object of test 37. Once the projection 36b reaches a detecting range of the projection detecting sensor 24 as the rotary cam 17 further rotates back, the impact test apparatus is brought back to the conditions of FIG. 3A.

Namely, one impact test is completed when the projection detecting sensor 24 has sequentially detected all of the four projections 36a-36d.

The following lines describe an operational sequence of the impact test process. First, the human test operator sets a desired number of times of object-of-test hitting (e.g., five) by means of the number-of-hitting setting dial 31. The thus-set number of object-of-test hitting is displayed on the display section 32.

Then, once the test operator depresses the start switch 28, the rotational drive unit 13 is activated to cause the rotary cam 17 to start rotating, so that the impact test is carried out in the manner as shown in FIGS. 3A-3C.

During the impact test, the projection detecting sensor 24 sequentially detects the projections 36a-36d. Each projection detection signal is sent to the number-of-rotation calculation section 33. Once four projection detection signals are received from the sensor 24 in succession, the calculation section 33 judges that the single operational sequence of the impact test has been completed, assuming that one rotation of the rotary cam 17 has been made. Then, the number-of-rotation calculation section 33 causes the actual number-of-rotation display section 34 to display an accumulated number of rotation of the cam 17. On the actual number of rotation display section 34, any numerical value in a range of 0 (zero) to the operator-set value is displayed to inform the human test operator of a progress status of the test. Once the actual number of rotation of the rotary cam 17 reaches the operator-set value, the control unit 27 sounds the buzzer 35, stops electric power supply to the rotational drive unit 13 and places the brake 14 in a braking state.

By the rotary cam 17 being rotated continuously at a predetermined speed, five impact tests, for example, can be carried out in succession. Thus, the human test operator only has to perform operation for starting the impact test, so that a load imposed on the test operator in connection with the impact tests can be significantly reduced.

Figure 4:
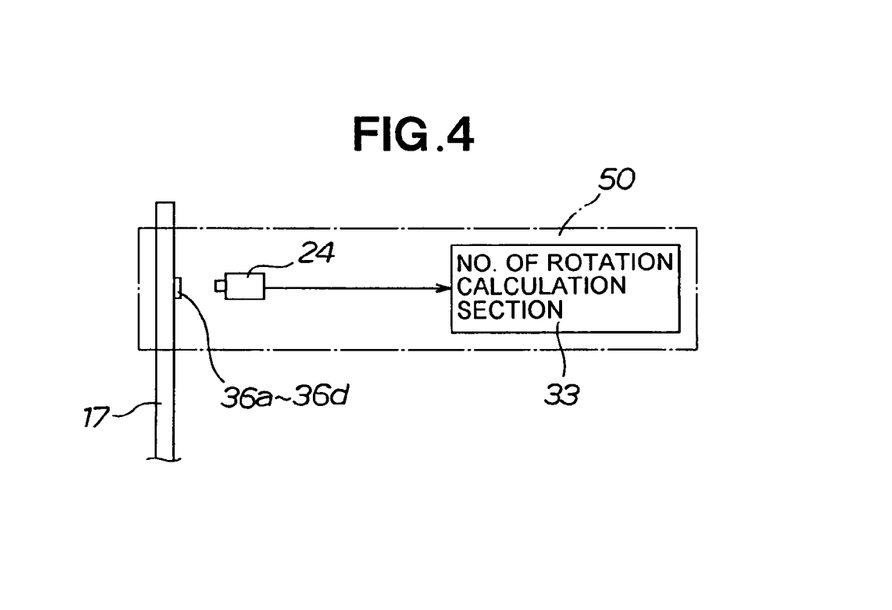
FIG. 4 is a diagram showing a construction of a number-of-hitting detection section employed in the first embodiment.

FIG. 4 shows a number-of-hitting detection section 50 which detects the number of impact tests, i.e. which detects the number of object-of-detection hitting by detecting the number of rotation of the rotary cam 17.

The number-of-hitting detection section 50 includes: the plurality of projections 36a, 36b, 36c and 36d provided on one side surface of the rotary cam 17; the projection detecting sensor 24 that sequentially detects these projections 36a, 36b, 36c and 36d; and the number-of-rotation calculation section 33 that calculates the number of rotation of the rotary cam 17 on the basis of detection information from the sensor 24.

Figure 5:
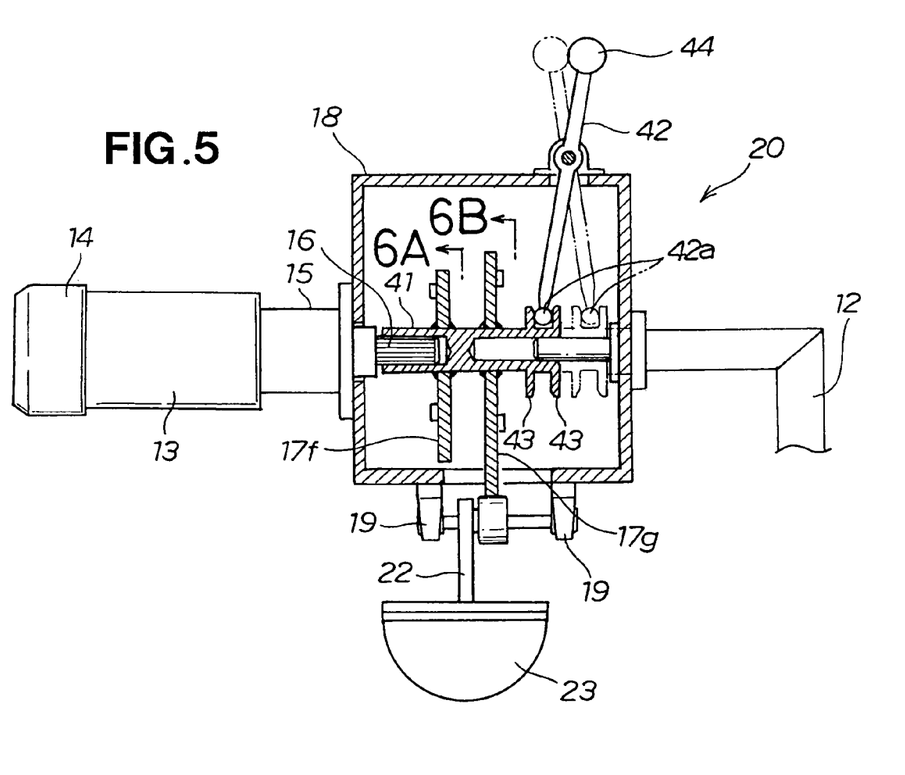
FIG. 5 is a partly-sectional side view showing an impact test apparatus according to a second embodiment of the present invention.

FIG. 5 shows an impact test apparatus 20 according to a second embodiment of the present invention, where the same elements as in the first embodiment of FIG. 1 are indicated by the same reference characters and will not be described here to avoid unnecessary duplication. The second embodiment of the impact test apparatus 20 is similar to the above-described first embodiment but different therefrom in terms of structural arrangements within the box frame 18.

Namely, in the second embodiment, the rotation shaft 16 in the first embodiment is replaced with a spline shaft on which is axially movably mounted a movable shaft 41. Small and large rotation cam members 17f and 17g are mounted on the movable shaft 41 within the box frame 18, and fork-shaped receiving flanges 43 are formed integrally with the movable shaft 41.

Distal end portion 42a of a shift lever 42 is inserted between the fork-shaped receiving flanges 43, and the shift lever 42 is pivotably supported by the box frame 18. Knob 44 is provided on the proximal end of the shift lever 42.

Figure 6A:
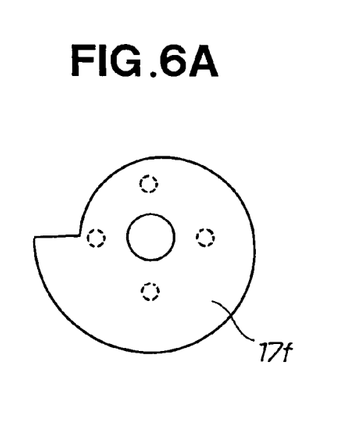
FIG. 6A is a view taken in the direction of arrow 6A of FIG. 5.
Figure 6B:
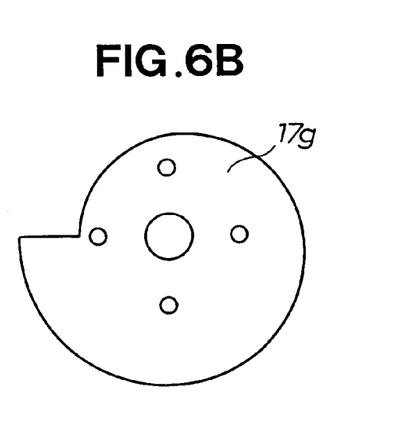
FIG. 6B is a view taken in a direction of arrow 6B of FIG. 5 and showing a large rotary cam employed in the second embodiment.

FIG. 6A shows the small rotary cam member 17f of FIG. 5, while FIG. 6B shows the large rotary cam member 17g of FIG. 5.

In the state illustrated in FIG. 5, the large rotary cam member 17g contributes to the swinging movement of the pendulum arm 22. As the human test operator operates the knob 44 to cause the shift lever 42 to pivot in the counter-clockwise direction, the movable shaft 41 moves rightward as indicated by an imaginary line in FIG. 5. Then, the small rotary cam member 17f contributes to the swinging movement of the pendulum arm 22, taking over the large rotary cam member 17g.

In the aforementioned manner, there can be achieved an impact test apparatus which can perform impact tests of two different specifications.

FIGS. 7-10 shows an impact test apparatus 30 according to a third embodiment, where the same elements as in the first embodiment of FIG. 1 are indicated by the same reference characters and will not be described here to avoid unnecessary duplication. The third embodiment of the impact test apparatus 30 is similar to the above-described second embodiment in that the small and large rotation cam members 17f and 17g are mounted within the box frame 18, but different from the second embodiment in that these rotary cam members 17f and 17g are fixed to the rotation shaft 16 and a relay member 46 is disposed between the small and large rotation cam members 17f and 17g and the pendulum arm 22.

The relay member 46 is connected to a shift shaft 47 which is in turn movably supported by the box frame 18 via bosses 48. As the human test operator operates a knob 49 to cause the shift shaft 47 to move in a leftward/rightward direction of FIG. 7, the relay member 46 selectively abuts against the small or large rotation cam member 17f or 17g.

Figure 8:
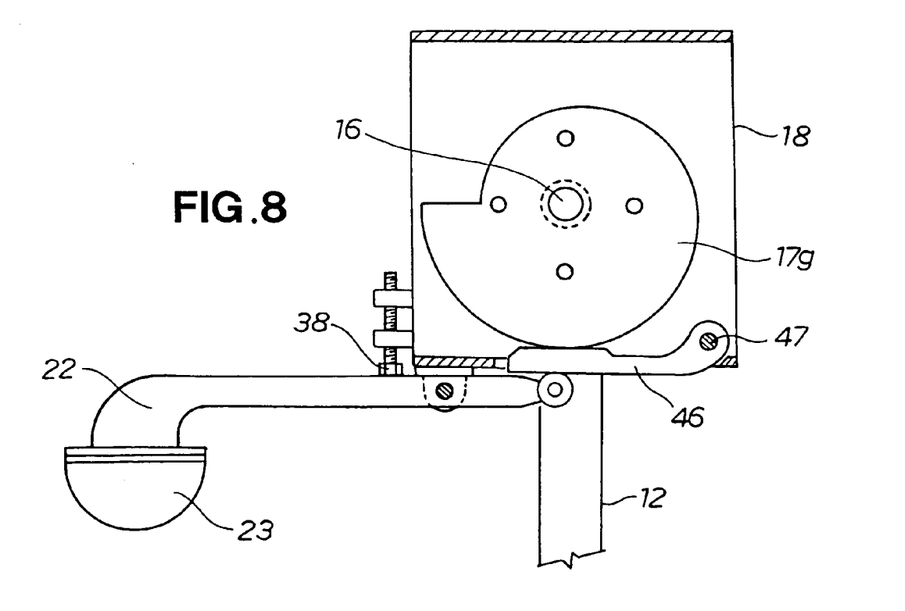
FIG. 8 is a sectional view taken along line 8-8 of FIG. 7.

As the large rotary cam member 17g rotates, the relay member 46 swings up and down about the shift shaft 47 and thereby causes the pendulum arm 22 to swing, as seen from FIG. 8.

Figure 9:
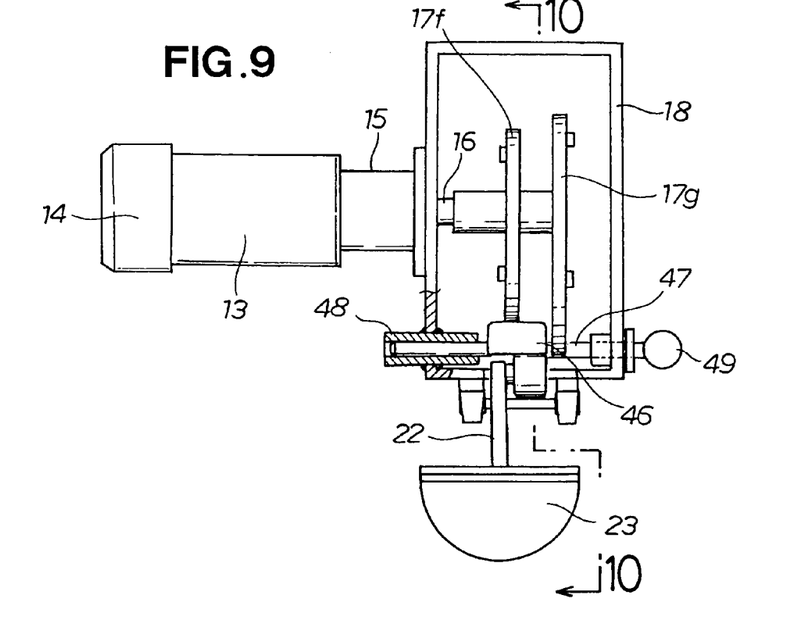
FIG. 9 is a view showing a state when a relay member shown in FIG. 7 has been moved in the third embodiment.

Further, as the relay member 46 is shifted leftward, it abuts against the small rotary cam member 17f, as seen in FIG. 9.

Figure 10:
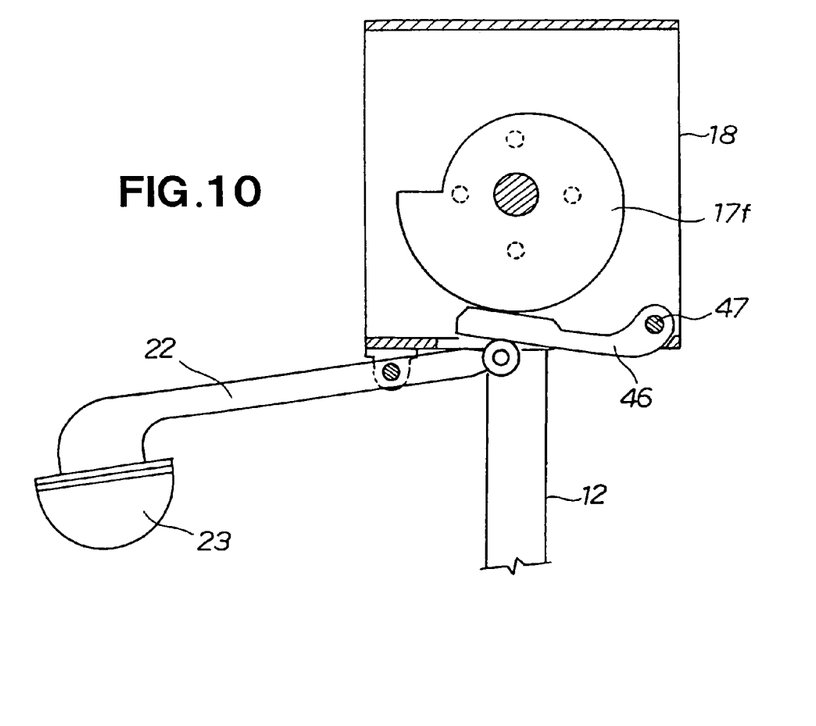
FIG. 10 is a sectional view taken along line 10-10 of FIG. 9.

Furthermore, as the small rotary cam member 17f rotates, the relay member 46 swings up and down about the shift shaft 47 and thereby causes the pendulum arm 22 to swing, as seen from FIG. 10.

Figure 7:
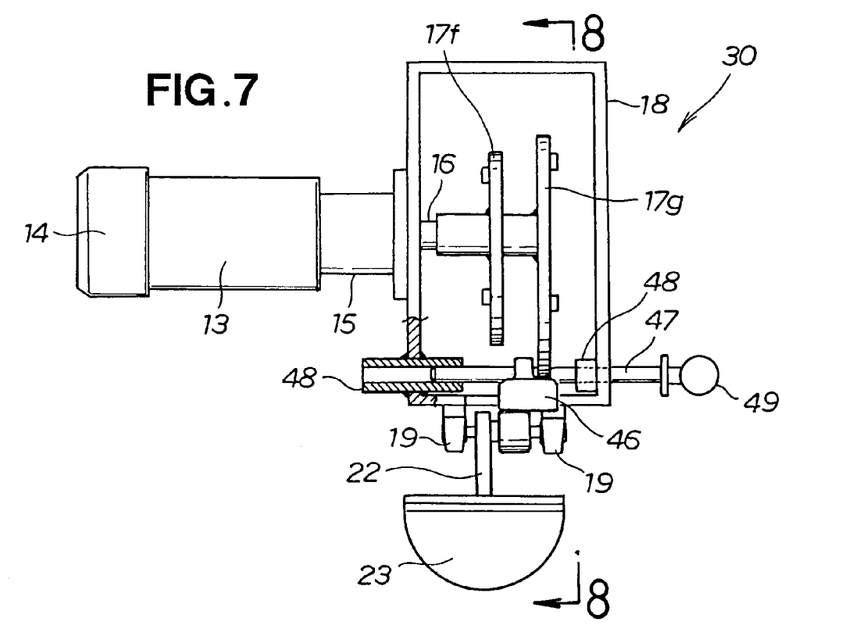
FIG. 7 is a partly-sectional side view showing an impact test apparatus according to a third embodiment of the present invention.

Whereas the third embodiment is shown in FIGS. 7 and 9 as including just two rotary cam members 17 for convenience of explanation, it may include three or more rotary cam members 17 depending on the type of the object of test. With such three or more rotary cam members 17, the third embodiment of the impact test apparatus can perform impact tests of a plurality of types of automotive vehicles, such as SUVs (Sports Utility Vehicles), sedans and sports cars, differing from one another in window inclination.

Obviously, various minor changes and modifications of the present invention are possible in light of the above teaching. It is therefore to be understood that within the scope of the appended claims the invention may be practiced otherwise than as specifically described.

What is claimed is:

1. An impact test apparatus comprising:
   a support post disposed on a base plate;
   rotational drive means supported by the support post;
   a rotary cam adapted to be rotated by the rotational drive means;
   a pendulum arm supported by the support post for swinging movement in an up-down direction; and
   a hammer disposed on a distal end portion of the pendulum arm,
   wherein the pendulum arm has a proximal end portion abutting against the rotary cam, and the rotary cam is rotated by the rotational drive means in one direction and a necessary number of times.

2. The impact test apparatus of claim 1 which further comprises number-of-hitting detection means for detecting a number of rotation of the rotary cam to thereby detect a number of times of hitting, by the hammer, of an object of test.

3. The impact test apparatus of claim 2 wherein the number-of-hitting detection means includes a plurality of projections provided on one side surface of the rotary cam, a projection detecting sensor for detecting the projections, and a number-of-rotation calculation section for calculating the number of rotation of the rotary cam on the basis of detection information acquired by the projection detecting sensor.

4. The impact test apparatus of claim 1 wherein the rotational drive means includes a brake.

5. The impact test apparatus of claim 1 wherein the rotary cam comprises a plurality of rotary cam members differing from each other in cam shape, the rotary cam members are mounted on a common shaft in parallel to each other, and the common shaft is moved compulsorily so that one of the plurality of rotary cam members is caused to abut against a proximal end portion of the pendulum arm.

6. The impact test apparatus of claim 1 wherein the rotary cam comprises a plurality of rotary cam members differing from each other in cam shape, a relay member is provided between the rotary cam members and a proximal end portion of the pendulum arm, and the relay member is moved compulsorily so that one of the plurality of rotary cam members is caused to abut against the proximal end portion of the pendulum arm.

* * * * *